United States Patent [19]

Saglini et al.

[11] 4,229,684
[45] Oct. 21, 1980

[54] METHOD AND APPARATUS FOR TIME-OPTIMIZED POSITIONING OF AT LEAST ONE BODY IN A DESIRED TARGET POSITION

[75] Inventors: Marco Saglini, Muralto; Walter Meier, Losone, both of Switzerland

[73] Assignee: A.G. für Industrielle Elektronik AGIE Losone b. Locarno, Losone, Switzerland

[21] Appl. No.: 922,688

[22] Filed: Jul. 7, 1978

[30] Foreign Application Priority Data

Aug. 9, 1977 [CH] Switzerland ............... 11028/77

[51] Int. Cl.[3] .................................... G05B 13/00
[52] U.S. Cl. ................................ 318/561; 318/611
[58] Field of Search ........................ 318/561, 611

[56] References Cited

U.S. PATENT DOCUMENTS

| | | | |
|---|---|---|---|
| 3,836,833 | 9/1974 | Harris et al. | 318/561 |
| 3,860,861 | 1/1975 | Gucker | 318/561 |
| 3,893,616 | 7/1975 | Trousdale | 318/561 |
| 3,914,677 | 10/1975 | MacWade et al. | 318/561 |

OTHER PUBLICATIONS

Stephens, *IBM Technical Disclosure Bulletin*, "Jerk Reduction for Bang Bang Servos", vol. 14, No. 6, Nov. 1971, pp. 1731-1731a.

*Primary Examiner*—J. V. Truhe
*Assistant Examiner*—Eugene S. Indyk
*Attorney, Agent, or Firm*—Frishauf, Holtz, Goodman & Woodward

[57] ABSTRACT

Disclosed is a system and method for controlling the motor drive for positioning a workpiece on a compound slide in such a way that the workpiece arrives at the target position in minimum elapsed time and without overshoot. A fixed program memory, in conjunction with a comparator and a combiner, is used to process information as to the actual position and velocity of the body and the desired position and velocity of the body to determine the optimum torque for the motor. The memory includes information as to the control characteristics of the motor and the desired path yet to be traveled to the target position.

The method of positioning comprises the steps of controlling the motor so that it runs initially at maximum torque in a first region, at less than maximum torque and in the same direction in a second region, and then at yet another torque magnitude and with the torque in the opposite direction in a third region. The torque is brought to zero value within a predetermined distance from the target position.

4 Claims, 2 Drawing Figures

METHOD AND APPARATUS FOR TIME-OPTIMIZED POSITIONING OF AT LEAST ONE BODY IN A DESIRED TARGET POSITION

BACKGROUND OF THE INVENTION

The invention relates to a method and an apparatus for time-optimized positioning of at least one body in a desired target position, by which the body is brought into the target position independently of the traversed path and without overshoot.

In known apparatus for the mechanical positioning of mechanical elements of peripheral equipment, such as for example tape memories, disc memories, reading heads, and printing heads, or for numerically controlled movements of machine tools of drafting machines or similar apparatus, it is desired that the target position is reached in a time-optimized manner without overshoot or oscillation about the target location and without regard to the already traversed positioning path.

A known method, or rather arrangement, of the data processing technology is described in U.S. Pat. No. 3,893,695, Rickert. This known method does not choose the optimum deceleration characteristic, but rather one which crosses the optimum deceleration characteristic. The actual process of deceleration, or rather of the positioning of the body, occurs through step-like approximations of the deceleration curve. The disadvantage lies in that the positioning process does not occur in the optimum time.

Another known arrangement is disclosed in the published German patent application DE-OS 2,334,455 (Siemens AG). In this known arrangement, the body is brought to rest through a number of braking cycles. An approximating process calculates the number of the braking cycles and their respective deceleration magnitudes. Here the approximation process is a certain approximation of the ideal deceleration characteristic. An essential disadvantage of this known arrangement lies in that the condition of time optimization is not fulfilled because of the numerous braking processes, or rather braking cycles. This is partly the case because the last part of the travel, just before the desired position, is in a creep mode.

An object of the present invention is to avoid the disadvantages of the known methods or apparatus. The present invention permits positioning the body in accordance with the theoretical braking characteristic, and not in accordance with some approximation of this braking characteristic, as is the case for known systems. Furthermore, the present invention makes feasible for the positioning to be in accordance with the definition of "time-optimized processes", that is, the magnitude of the limiting parameter is held at maximum and its sign may only change once during the entire process. This definition is described in the book, "Rechengeraete in automatischen Systemen", by Prof. Dr. A. A. Feldbaum (Moskau), Verlag R. Oldenbourg (publisher), Muenchen, 1962, page 193. With regard to the present invention, the limiting parameter is the maximum torque of the motor which brings the body to be positioned into its target position. In accordance with the invention, the sign of this torque is changed only once during the positioning process.

It is a further purpose of the invention to permit the body to be moved with various chosen and controlled speeds. The body to be positioned may be, for example, a reading head, a recording head in memories or in peripheral equipment of data processing technology, or a slide of an instrument for plotting or drafting.

SUMMARY OF THE INVENTION

Apparatus in accordance with the invention is characterized in the arrangement in combination of the following:
- a subtracter subtracts the actual value of the position of the body from the desired positional value that it should have;
- a read-out memory with a fixed program receives the difference in signals representing the actual and the desired value of the position as address for the storage locations of the memory and in its output lines generates signals which correspond to the content of the memory locations determined by the address, the output signals representing the desired velocity of the positioning process and the initiation point of the braking;
- a comparator connected to the memory receives the given desired value signals from the read-out memory and those signals which represent the actual velocity of the body and which are generated by a tachogenerator coupled to a drive element for positioning the body, by which the comparator compares the two velocities with one another and generates a bivalent output signal;
- a quadrant-area-identifier couples the comparator output signal with the polarity of the actual velocity and with the polarity of the positional error in such a way that the drive for the body is given the order to brake.

An embodiment of the invention will be described in more detail with reference to the drawings.

DETAILED DESCRIPTION

Figure 1:
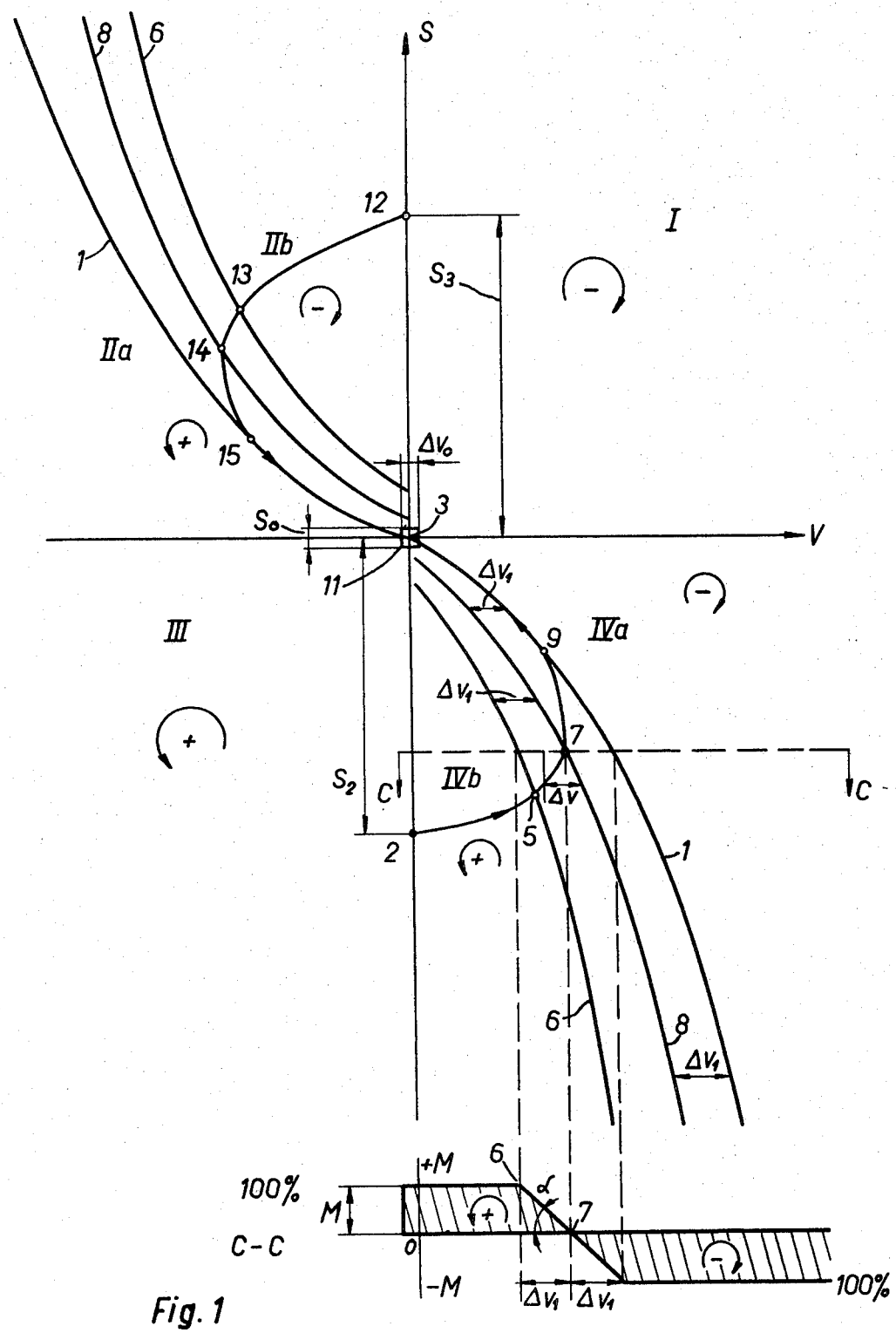
FIG. 1 is a graphical representation of a braking characteristic for explaining the time-optimized positioning process, as well as any desired rapid traverse rates with self-regulating effect.

FIG. 1 shows a braking characteristic for a time-optimized positioning process. The velocity-trajectory coordinate system includes an abscissa indicating the speed (angular velocity or translational speed) v and an ordinate indicating the path s. The ideal braking curve is given by the solution to the first order differential equations of motion of the positioning system. This braking curve can be drawn as the parabola in accordance with FIG. 1 or as a superpositioned linear component and a natural logarithmic component of a mathematical equation. This depends on the type of control for the positioning drive motor. The parabola-shaped braking curve 1 is used when the electrical drive motor is current-regulated, that is when the drive motor draws a current which is constant and independent of the speed of revolution outside of the zone between the curves 1 and 6. This applies by analogy to an electrical linear motor as well as to a non-electrical motor, such as for example a pneumatic or a hydraulic motor. The other form of the braking curve 1 is used when the electrical motor is voltage controlled, that is when outside the zone between the curves 1 and 6 the motor is under a constant voltage which is independent of the speed of revolution. The same applies analogously to an electrical linear motor as well as to a non-electric motor, such as for example a pneumatic or hydraulic motor.

The ideal braking curve 1 of FIG. 1 passes through the intersection 3 of the velocity-trajectory coordinate system. About the intersection is the target region 11, into which the body is to be positioned. This will be discussed later in more detail with respect to two positioning processes. The curves 8 and 6 arise through a parallel displacement of the chosen braking curve 1 in the direction of the abscissa v by an amount $\Delta v_1$ and $2\Delta v_1$ respectively. The amount $\Delta v_1$ is determined by the stability of the positioning system required for the particular rapid movement rate that is chosen. The curve 8 and the chosen amount $\Delta v_1$ are stored in the circuit of FIG. 2, which will be described later.

The curves 1, 6, 8 are drawn in the quadrants II and IV in the FIG. 1. They can also lie without any difficulties in the quadrants I and/or III. A single quadrant of the velocity-trajectory coordinate system is completely sufficient for a positioning process. In the quadrants, the polarities of the torque of the motor which is to transport the body to the target 3 are represented by a "+" or a "−" sign in an arced arrow. The curve 8 separates one quadrant into two quadrant regions with different torques, such as for example IIa, IIb or IVa, IVb.

The lower portion of the FIG. 1 is a sectional representation along the section line C—C. This sectional representation shows that between the curves 6 and 1 the torque M of the drive motor changes only from its maximum value in one direction (+M) to its maximum value in the other direction (−M). This represents an advantageous expansion of the definition given in the Background Of The Invention section above to the effect that for time-optimized processes the torque is constant and changes its sign only once.

In the following there will be described two positioning processes in connection with the FIG. 1. Let it be assumed that the body finds itself spaced $S_2$ at the point 2 on the ordinate S and is to be brought to the desired target point 3 in a time-optimized manner. The apparatus which performs this time-optimized positioning process will be described in more detail later with respect to the FIG. 2. The point 3 represents the origin of the velocity-trajectory coordinate system of FIG. 1. The drive motor delivers only the one hundred percent, that is the maximum, moment of acceleration M, so that the body moves from the point 2 to the intersection point 5 along the curve 6. The trajectory curve which the body thus follows is drawn in in FIG. 1. At the intersection point 5 the maximum torque ceased in accordance with the definition. This is shown in the lower part of the FIG. 1 in the sectional representation C—C. The sign of the torque continues to be the same. This is shown in the quadrant region IVb by the circular arrow with the "+" sign. The velocity increases to a lesser extent than before. The path s to the target position 3 decreases. The body moves along the trajectory and reaches the intersection point 7 on the curve 8. The curve 8 indicates the geometrical locations at which the torque M of the drive motor changes its sign and has a zero value. The drive motor now begins to develop a braking torque, the value of which changes in accordance with the slope between the curves 6 and 1. The slope in the section C—C is obtained from the equation $$tg\alpha = M/\Delta v_1 \qquad (1)$$

The instantaneous value of the torque in the zone between the curves 1 and 6 is given by the following equation:

$$M_{motor} = M\Delta v/\Delta v_1 \qquad (2)$$

As a result of the braking torque M, which increases to a maximum, or one hundred percent value, the body swings over the shortest path to the ideal braking curve 1 and moves along this braking curve to the target point 3. FIG. 1—bottom shows that as of the point 7, the value of the speed decreases. It also shown that the target position 3 is within a region 11, the extent of which is defined by the coordinate increments $\Delta v_0$ and $\Delta s_0$ of the velocity-trajectory coordinate system. Within this region 11, the circuit of FIG. 2 in accordance with the invention operates in such a way that the drive motor develops no torque. The value $\Delta s_0$ is equal to or smaller than the desired positional accuracy. The value $\Delta v_0$ is equal to or smaller that twice the value of the desired speed solution. The region 11 thus assures the stability of the system at the target 3. The just-described positioning process in the quadrant IV, which because of the sign of the torque is divided into the quadrant regions IVa and IVb, relates to a procedure in which the body was moved in a particular direction. If the body is now to be moved for positioning in an opposite direction, then the positioning process takes place in quadrant II.

The quadrant II is divided by the curve 8 into the two quadrant regions IIa, IIb, with the torque M sign being positive in the quadrant region IIa and being negative in the quadrant region IIb. The body, which at point 12 is spaced a distance $s_3$ from the target point, is now moved along the shown trajectory to the intersection point 13 with the curve 6. The torque, which in the quadrant region IIb has a negative polarity, indicates in this case an acceleration, and not, as in the quadrant region IVa, a braking. When the body has reached the intersection point 13 with the curve 6 in the quadrant region IIb, the magnitude of the torque changes. The polarity of the torque, however, is still the same. The body now reaches in the trajectory the next intersection point 14 with the curve 8. The velocity v still increases in this path. The distance s to the target point 3 has decreased. At the intersection point 14, the torque changes its polarity, which in the following quadrant region IIa is indicated by the sign +. The value of the braking torque again increases to its maximum. The velocity v decreases correspondingly. The body swings to the ideal braking curve 1 in an optimally short time and moves along it to the target position 3, which is in the zero torque region 11. The coordinates $\Delta v_0$ and $\Delta s_0$ of the region 11 have already been discussed in more detail in the previous positioning example.

Figure 2:
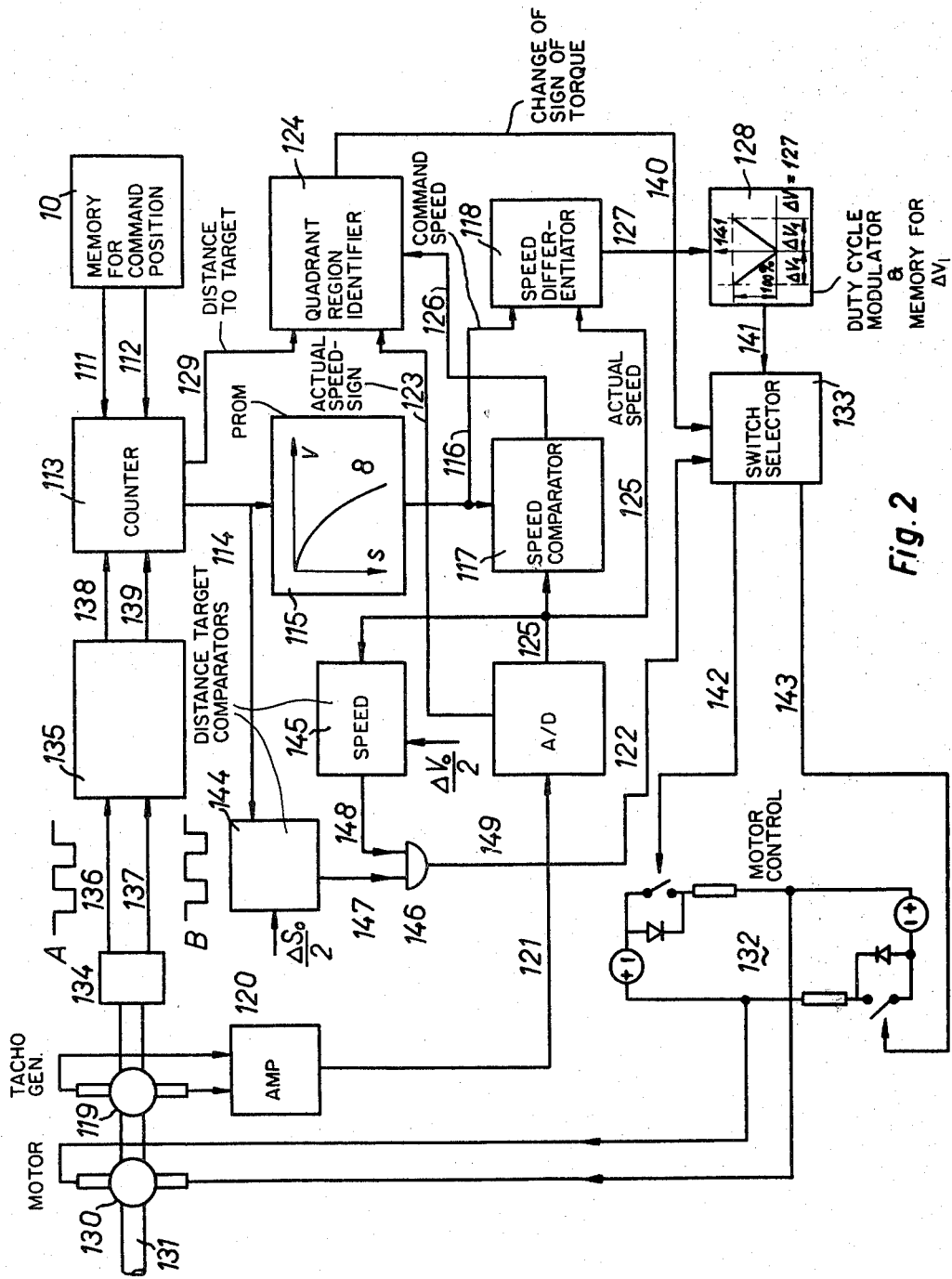
FIG. 2 is a block circuit diagram of a control device in accordance with a preferred embodiment of the present invention.

FIG. 2 shows the circuit arrangement of a control device for the time-optimized positioning of a body in accordance with the present invention. In the present embodiment the body is to be a slide which is to be moved on a machine tool, beginning at a position 2, in a predetermined direction to a target point 3. It is assumed that the slide finds itself in the position 2 of the FIG. 1. The position information is stored in accordance with FIG. 2 in a memory 10, such as a perforated tape or a magnetic tape or the like, and is fed as the desired value over the leads 111 and 112 to a digital subtractor 113, which is designed as a forward and backward counter. The digital subtractor 113 receives impulses corresponding to the desired path through the lead 111 and to the desired direction of motion of the body through the lead 112. The subtractor previously had a memory content of zero. Any suitable and well known equipment may be used to provide a signal representative of actual position or, rather, change from an actual position to the bidirectional counter 113, for comparison or subtraction from the signals on leads 111, 112. FIG. 2 shows an actual position change signal generator 134, connected to the tachometer generator 119 which, for example, may be any suitable incremental encoder and which provides output signals A and B representative of magnitude and direction on lines 136, 137, where they are converted in wave shaper and signal converter 135 to be suitable for direct comparison in the bidirectional counter 113, being applied thereto on lines 138, 139. Now its content is different from a zero value. Reaching the first input of the quadrant region identifier 124 through the lead 129 is a binary signal which represents the sign of the memory of the subtractor 113 and thereby states whether the body finds itself above (quadrants I, II) or below (quadrants III, IV) the v-abscissa in FIG. 1. The content of the subtractor 113, which represents the path $S_2$ still to be traversed to the target position 3, is given through the n-bit lead 114 as the address signal to the programmable readout memory 115. The number n of bits is determined by the desired path resolution and the desired maximum speed of the system. In the example of FIG. 2 there are 8-bit leads. The curve 8 of FIG. 1 is stored in the programmable read-out memory (PROM). The digital output signals of the programmable read-out memory 115 are fed in parallel form to the speed comparator 117 through the 8-bit lead 116 and parallel thereto to the 8-bit input of the speed differentiator 118. Since in this condition the motor 130 has not yet been put into motion, the tacho-generator 119, which is connected to the same shaft as is the drive motor 130, does not put out a voltage to the tacho-amplifier 120. For this reason, no signal goes to the input of the analog-digital converter 122 through the lead 121. The converter 122 sends through its output lead 123 a binary signal which represents the actual speed to the input of the quadrant region identifier 124. Since there is as yet no actual speed of the shaft 131 and the motor 130, the sign of the torque of the motor 130 to be developed in the quadrant region identifier 124 has as yet no significance. In this case, the converter 122 gives the speed comparator 117 a signal corresponding to the actual speed through the 8-bit lead 125. This signal shows the speed comparator 117 that the motor 130, the shaft 131, and therewith the body which is to be positioned, all do not as yet have an actual speed. Further, and in parallel thereto, the convertor 122 gives the magnitude signal to the second 8-bit input of the speed differentiator 118. It is now determined in the comparator 117 that the desired speed signal from the memory 115 is greater than the actual speed signal from the converter 122. In this case, the speed comparator 117 puts out a binary signal through the lead 126 to the third input of the quadrant region identifier 124. The three binary input signals are logically combined in the quadrant region identifier 124 in such a way that during the entire positioning procedure the correct, that is, the desired sign of the torque M of the motor 130 is present. The output signal 140 puts the information into the current loop 133, which will be described later in more detail. In the speed differentiator 118 it has now been established that the desired speed signal from the 8-bit lead 116 (from the PROM 115) is greater than the actual speed signal from the 8-bit lead 125 (converter 122). The output signal for this difference, which is represented by the $\Delta\omega$ (angular velocity) or by $\Delta v$ (translational speed), reaches the duty cycle modulator 128 through the 8-bit lead 127. The modulator 128 generates in the lead 141 a digital signal with constant frequency, constant amplitude, and with variable duty time resulting in pulse operation of the motor. The duty time obeys the relationship $$\Delta v/\Delta v_1 \times 100\% \tag{3}$$

This relationship (3) is valid for the case when $\Delta v \leq \Delta v_1$.

For the case when $\Delta v = \Delta v_1$, the duty cycle is 100%. In this case the relationship (3) is not valid.

In the modulator 128 there is stored the fixed and desired value $\Delta v_1$. This is apparent from the FIG. 2.

To complete the setting up of the circuit shown in FIG. 2, the values $\Delta s_0$ and $\Delta v_0$ (FIG. 1) of the target region 11 must be fixed. The desired value $\Delta s_0$, which corresponds to twice the positional accuracy, is entered into the comparator 144 as $\Delta s_0/2$. So long as the content of the subtractor 113 is greater than the entered value $\Delta s_0/2$, the comparator 144 puts out a logic "0" signal on its output lead 147. When the content of the subtractor 113 is the same or smaller than the fed in value $\Delta s_0/2$, then the comparator 144 generates a logic "1" signal in its output lead 147. The second parameter $\Delta v_0$ defining in the comparator 145 the target region 11 and which represents double the value of the velocity solution, is entered as $\Delta v_00/2$. So long as the velocity impulses of the actual shaft 131 speed from the analog-digital converter are greater than the entered value $\Delta v_0/2$, the comparator 145 puts out a logic "0" signal on its output lead 148. When the velocity from the analog-digital converter 122 through the lead 125 is equal to or smaller than the entered value $\Delta v_0/2$, the comparator 145 generates a logic "1" signal in its output lead 148. In this case "1" logic signals are on both of the leads 147 and 148. The AND-gate 146 puts an output signal through lead 149 into the control circuit 133, so that the motor 130 is shut off by the circuit 132. This means that there is a no-torque condition.

In order to better explain the circuit arrangement shown in the FIG. 2, it is assumed that the positioning process is to be carried out in the quadrant IV of FIG. 1. By this time, the quadrant-region identifier 124 has received through the lead 123 from the analog-digital converter 122 the actual value signal for the direction of the velocity, this being presented as a binary signal, even when the magnitude of the velocity is still zero. The quadrant-region identifier 124 also receives through lead 126 from the comparator 117 the binary signal which indicates whether the desired velocity is greater than the actual velocity or not. From these three signals through the leads 123, 126, 129 the quadrant-region identifier 124 generates in the lead 140 an output signal which determines the polarity of the torque of the motor 130. The switch-selector 133 operates through the leads 142, 143 on the control 132. In the closing of the corresponding switch in the control 132, the motor 130 is given the torque with the desired polarity, for example "+" (quadrant-region IVb, FIG. 1). The motor 130 immediately receives the maximum, one-hundred percent torque M. Upon initiation of movement of the body from the point 2 of FIG. 1, the tachogenerator 119 (FIG. 2) generates a voltage proportional to the velocity of the motor 130 and transmits it to the tacho-amplifier 120. This analog output signal of the tacho-amplifier 120 goes through the lead 121 to the analog-digital converter 122. This now puts into the leads 123 and 125 digital signals for the increasing actual velocity. The body moves from the point 2 to point 5 of FIG. 1. The speed comparator 117, which compares the desired and actual velocity signals in the 8-bit leads 116, 125, changes its output signal to the lead 126 at that moment when the value of the actual velocity is equal to or greater than the desired velocity. This occurs when the body is at point 7 of FIG. 2. As a result of the changed signal in the lead 126, the quadrant-region identifier 124 sends through its output lead 140 a signal to the switch-selector 133 commanding the selector to change the polarity of the torque M for the motor 130. In the control instrument 132, the electronic switches, which until now were open, are closed, and those which were until now closed are opened. The signals in the leads 123 and 129 are not changed, since the polarity of the velocity v (lead 123) and the polarity of the remaining of the path s to the target 3 (lead 129) do not change. As a result of the braking action of the torque, the velocity v and the remaining path s according to curve 1 of FIG. 1 decrease. As soon as the body reaches the region 11, the comparators 144 and 145 feed their logic polarity "1" into the leads 147 and 148. As a result of these two signals, the AND-gate 146 puts into the output lead 149 a signal which influences the control circuit 133 in such a way that the switches of the switch-selector 132 are opened. The drive motor 130 no longer receives current, so that in the target region 11 no torque is applied to the body to be positioned.

We claim:

1. Apparatus for time-optimizing positioning of a body at a target position (3) having a motor (130) driving the body with predetermined torque from a start position (2, 12) to the target positions (3) comprising
   means (10) storing an identification of the target position (3);
   means (134, 135) providing identification of an actual position of the body;
   means (113) comparing the actual and target position and providing a distance-to-target signal;
   means (119, 120, 122) furnishing a motor speed signal;
   quadrant identification means (124) responsive to the distance-to-target signal and the motor speed signal to determine, in a Cartesian coordinate system, the direction and distance of movement of the motor;
   speed-distance relation memory means (PROM, 115) storing a curve representative of the loci on a speed-distance curve at which the motor must reverse torque, while the body is being moved to the target and requiring only a single torque reversal;
   means (117, 126) coupled to the speed-distance relation memory means (115) and the motor speed furnishing means (119, 120, 122) and providing an output signal coupled to the quadrant region identification means (124) when, upon operation of the motor, the position of the body intersects the speed-distance curve stored in said speed distance relation memory means (115), said quadrant region identification means then providing a torque-reversal command signal;
   motor control means (132, 133) responsive to the distance-to-target signal as well as to the torque reversal command signal and controlling the motor to provide output torque first in the direction required to bring the body to the target and then, upon receiving the torque reversal command signal, to reverse the motor torque to brake approach of the body to the target;
   means (144) defining a target accuracy range ($\Delta s_o$) and representative of the maximum tolerance distance of positioning of the body from the target position, and furnishing a tolerance range signal;
   means (145) defining a target speed approach range ($\Delta v_o$) representative of maximum deviation of speed of the body when its movement is controlled by the motor from a commanded speed and furnishing an approach range signal;
   and means (146, 122) connected to and responsive to the tolerance range signal and the approach range signal additionally controlling the motor control means to deenergize the motor when the body is within the target accuracy range and moving at the approach range speed.

2. Apparatus according to claim 1, wherein the means (117, 126) providing the output signal upon positioning of the body at the intersection of the speed-distance curve comprises
   a comparator (177) receiving a signal representative of actual motor speed and a signal representative of commanded motor speed at the then pertaining distance from the target as determined by the speed-distance relation memory means (PROM, 115).

3. Apparatus according to claim 1, wherein the motor is pulse-operated;
   and further comprising error speed signal means (118) comparing a signal representative of the actual motor speed with a signal representative of commanded motor speed at the then pertaining distance from the target as determined by the speed-distance relation memory means (PROM, 115), and furnishing a speed error signal;
   a duty cycle modulator (128) connected to and controlling operation of the motor control means (132, 133) having stored therein a representation of the maximum duty cycle of the motor, connected to receive the error speed signal output from the speed signal comparison means (118) and providing a speed modulation output signal to the motor control means (132, 133) to modify the duty cycle to be no more than a maximum predetermined permissible rate of change of speed to ensure system stability.

4. Apparatus according to claim 3, wherein the means (117, 126) providing the output signal upon positioning of the body at the intersection of the speed-distance curves comprises a comparator (117) receiving the actual motor speed signal and the commanded motor speed signal then pertaining from the target as determined by the speed-distance relation memory means (PROM, 115).

* * * * *